United States Patent
Reyneke et al.

(10) Patent No.: US 7,311,813 B2
(45) Date of Patent: Dec. 25, 2007

(54) DISTILLATION SEQUENCE FOR THE PURIFICATION AND RECOVERY OF HYDROCARBONS

(75) Inventors: Rian Reyneke, Katy, TX (US); Michael Foral, Aurora, IL (US); Christos G. Papadopoulos, Naperville, IL (US); Jeffrey S. Logsdon, Naperville, IL (US); Wayne W. Y. Eng, League City, TX (US); Guang-Chung Lee, Houston, TX (US); Ian Sinclair, Warrington (GB)

(73) Assignee: Ineos USA LLC, Lisle, IL (US)

( * ) Notice: Subject to any disclaimer, the term of this patent is extended or adjusted under 35 U.S.C. 154(b) by 458 days.

(21) Appl. No.: 10/393,460

(22) Filed: Mar. 20, 2003

(65) Prior Publication Data

US 2004/0182752 A1   Sep. 23, 2004

(51) Int. Cl.
  *B01D 3/02* (2006.01)
  *B01D 3/06* (2006.01)
  *B01D 3/14* (2006.01)

(52) U.S. Cl. ............ 208/102; 208/103; 208/104; 208/354; 208/358; 585/809; 585/802; 203/71; 203/74; 203/75; 203/81; 203/82; 203/84

(58) Field of Classification Search ......... 208/102, 208/103, 104, 354, 358; 585/809, 802; 203/71, 203/74, 75, 81, 82, 84
See application file for complete search history.

(56) References Cited

U.S. PATENT DOCUMENTS 2,295,256 A * 9/1942 Brugma .............. 208/354
5,602,290 A * 2/1997 Fallon ................ 585/448
5,675,054 A * 10/1997 Manley et al. ........ 585/809

* cited by examiner

*Primary Examiner*—Tam M. Nguyen
(74) *Attorney, Agent, or Firm*—David P. Yusko

(57) ABSTRACT

This invention is an improved distillation sequence for the separation and purification of ethylene from a cracked gas. A hydrocarbon feed enters a C2 distributor column. The top of the C2 distributor column is thermally coupled to an ethylene distributor column, and the bottoms liquid of a C2 distributor column feeds a deethanizer column. The C2 distributor column utilizes a conventional reboiler. The top of the ethylene distributor is thermally coupled with a demethanizer column, and the bottoms liquid of the ethylene distributor feeds a C2 splitter column. The ethylene distributor column utilizes a conventional reboiler. The deethanizer and C2 splitter columns are also thermally coupled and operated at a substantially lower pressure than the C2 distributor column, the ethylene distributor column, and the demethanizer column. Alternatively, a hydrocarbon feed enters a deethanizer column. The top of the deethanizer is thermally coupled to an ethylene distributor column, and the ethylene distributor column utilizes a conventional reboiler. The top of the ethylene distributor column is thermally coupled with a demethanizer column, and the bottoms liquid of the ethylene distributor column feeds a C2 splitter column. The C2 splitter column operates at a pressure substantially lower than the ethylene distributor column, the demethanizer column, and the deethanizer column.

24 Claims, 2 Drawing Sheets

DISTILLATION SEQUENCE FOR THE PURIFICATION AND RECOVERY OF HYDROCARBONS

STATEMENT REGARDING FEDERALLY SPONSORED RESEARCH OR DEVELOPMENT

This invention was made with government support under United States Department of Energy Cooperative Agreement No. DE-FC07-01ID14090.

CROSS-REFERENCE TO RELATED APPLICATIONS

None.

BACKGROUND OF THE INVENTION

The use of distillation to purify products from olefins plants is well known in the art. Conventional distillation schemes typically have utilized "sharp-split" distillation, wherein each distillation column is used to make a sharp separation between adjacent components of a homologous series. In a sharp-split distillation sequence, each component leaves the distillation column in a single product stream, either as overheads or bottoms. An inherent inefficiency in sharp-split distillation can be observed by considering the number of phase changes necessary to produce a recoverable hydrocarbon component. For example, a hydrocarbon gas feed typically containing C1+ hydrocarbons, such as ethylene, is first condensed in a demethanizer, then revaporized in a deethanizer, and is finally condensed again as a liquid product from a C2 splitter. A total of three complete phase changes must be accomplished for all the ethylene. The same number of phase changes applies to ethane and propylene.

The number of phase changes needed to produce a hydrocarbon component such as ethylene can be reduced by utilizing a refinement upon conventional, sharp-split distillation. Such a refinement is known as distributed distillation. In a distributed distillation scheme, one or more of the feed components is "distributed" between the top and bottom of one or more distillation columns. Such schemes require less energy to operate than conventional sharp-split schemes. In addition, they provide additional degrees of freedom for energy optimization—namely the distribution ratio of the distributing components in each column. Finally, concepts of thermal coupling of columns can also be applied to olefins plant separations, further reducing energy requirements. Thermally coupled columns are those where at least some of the reboiling or condensing duty for one column is provided by a vapor or liquid sidedraw from another column. By doing so, the thermodynamically undesired "remixing" phenomenon can be minimized.

A discussion of distributed distillation that incorporates the features of thermal coupling is found in Manley (U.S. Pat. No. 5,675,054.) Manley recites fully thermally coupled embodiments for ethylene separation, including an embodiment that recites a front-end depropanizer ethylene recovery and purification process that utilizes full thermal coupling of the C2s distributor and ethylene distributor. The thermal coupling of the columns is integral to the claimed energy efficiency of this prior art process. It is important to note that all of the columns recited in Manley's embodiments operate at substantially the same pressure, with any differences in pressure due to typical hydraulic pressure drops through the columns, exchangers, and piping. Substantial differences in pressure between the columns would require vapor compression or liquid pumping between columns.

Manley recites that such a fully-coupled distributed distillation system has lower energy requirements than systems that are not thermally coupled. Conventional wisdom suggests that such an arrangement, being fully thermally coupled, would be more energy efficient than a scheme that has no couples or is only partially thermally coupled.

Surprisingly, we have found out that such a fully distributed distillation sequence is not as energy efficient as this invention. Two of the thermal couples taught by Manley, specifically the thermal couple between the C2 distributor and deethanizer columns and the thermal couple between the ethylene distributor and the deethanizer or C2 splitter, actually increase the energy requirement for the process when implemented in a conventional cracker with conventional refrigeration equipment. The distillation system of this invention, therefore, does not include these couples and represents an unexpected improvement in energy savings as compared to Manley.

In addition, it has been found that removing these two thermal couples allows the deethanizer/C2 splitter to be operated at a lower, more optimal pressure than the rest of the distillation sequence. The full thermal coupling recited by Manley, on the other hand, requires that all columns be operated at roughly the same pressure, or utilize energy intensive vapor recompression between columns.

SUMMARY OF THE INVENTION

In one aspect of the invention, the hydrocarbon feed comprising hydrogen, methane, ethane, ethylene, propane, propylene, and optionally heavier components, is introduced into a C2 distributor to produce a first overhead and a first bottom stream. The first overhead stream is introduced into an ethylene distributor, and the first bottom stream is introduced into a deethanizer. The C2 distributor and the ethylene distributor are thermally coupled, but the C2 distributor and the deethanizer are not thermally coupled. The C2 distributor utilizes a conventional reboiler exchanger and is refluxed with a liquid side draw from the ethylene distributor. The hydrocarbon feed to the ethylene distributor is distributed as a second top stream and a second bottom stream. The second top stream is introduced into a demethanizer to produce a fourth top stream and fourth bottom stream, and the second bottom stream is introduced into a C2 splitter. The ethylene distributor and the demethanizer are thermally coupled, but the ethylene distributor and C2 splitter are not thermally coupled. The fourth top stream is sent for hydrogen recovery, and the fourth bottom stream is recovered as ethylene. The ethylene distributor utilizes a conventional reboiler exchanger and is refluxed with a liquid side draw from the demethanizer. The hydrocarbon feed to the deethanizer is distributed as a third top stream and a third bottom stream. The third top stream is introduced into the C2 splitter, and the third bottom stream can be introduced into a C3 splitter for recovery propane and propylene components. The deethanizer and the C2 splitter are thermally coupled. The hydrocarbon feeds to the C2 splitter are distributed as a fifth top stream as recoverable ethylene, and a fifth bottom stream for ethane recycling.

In another aspect of the invention, a hydrocarbon feed comprising hydrogen, methane, ethane, ethylene, propane, propylene, and optionally heavier components, is introduced into a deethanizer to produce a first top stream and a first bottom stream. The first top stream is introduced into an ethylene distributor to produce a second top stream and a second bottom stream. The deethanizer is refluxed with a liquid draw from the ethylene distributor. The second top stream is introduced into a demethanizer to produce a third top stream and a third bottom stream. The third top stream is sent for hydrogen recovery and the third bottom stream is recovered as ethylene. The ethylene distributor is refluxed with a liquid draw from the demethanizer. In addition, the ethylene distributor is reboiled with a reboiler exchanger. The second bottom stream is introduced into the C2 splitter to produce a fourth top stream and a fourth bottom stream. The fourth top stream is recovered as ethylene and the fourth bottom stream is sent for ethane recycling.

The process shall be described for the purposes of illustration only in connection with certain embodiments. However, it is recognized that various changes, additions, improvements and modifications to the illustrated embodiments may be made by those persons skilled in the art, all falling within the spirit and scope of the invention.

DETAILED DESCRIPTION OF THE INVENTION

Figure 1:
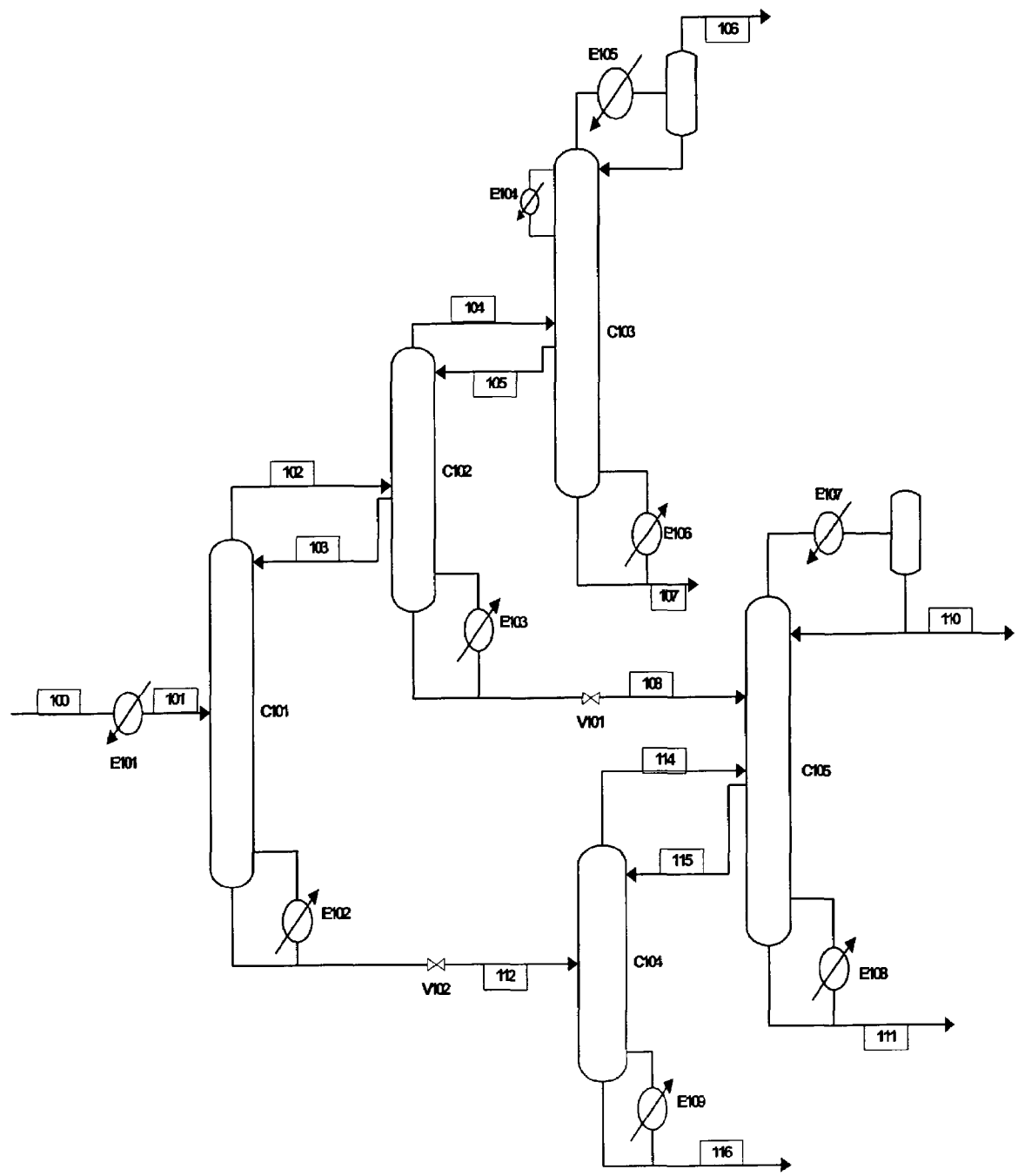
FIG. 1 depicts a front-end depropanizer ethylene recovery and purification design containing both a C2s distributor and an ethylene distributor.

With reference to FIG. 1, the feed stream to the process begins as an overhead stream from a depropanizer tower (not shown) and enters the process via stream 100. Stream 100 comprises a mixture of hydrogen, methane, ethane, ethylene, propane, and propylene. Stream 100 has optionally been passed through a hydrogenation reactor in order to remove essentially all of the acetylene as well as portions of the methylacetylene and propadiene. The depropanizer overhead is optionally cooled in exchanger E101 before entering column C101 as stream 101.

Column C101 is a distillation apparatus that serves as a C2s distributor. It can be either a trayed or packed column. The overheads of the column exit in stream 102 and contain essentially all of the hydrogen and methane present in the column feed, as well as a fraction of the ethane and ethylene. Column C101 is controlled such that little or no propane or propylene is contained in stream 102. The bottoms of C101 exit in stream 112 and contain essentially all of the propane and propylene present in the column feed, as well as the remainder of the ethylene and ethane. Column C101 is controlled such that there is little or no methane in the column bottoms.

Stream 102 is fed to column C102, which acts as an ethylene distributor. Columns C101 and C102 are thermally coupled in that a liquid side draw from C102, depicted as stream 103, provides reflux to C101. Stream 112 is fed to column C104, which acts as a deethanizer tower. The C2s distributor, depicted as column C101, and the deethanizer, depicted as column C104, are not thermally coupled. Column C101 is reboiled in the conventional manner with reboiler exchanger E102. It has been surprisingly found that removing the thermal couple between columns C101 and C104 actually improves the energy efficiency of the process. Also important to this invention is that the pressure of stream 112 is decreased before it is fed to column C104. The figure shows this pressure reduction being accomplished through a pressure letdown valve, V102, though other methods are available and known to those skilled in the art.

The overheads of C102 are removed as stream 104 and the bottoms are removed as stream 108. The overheads of C102 contain hydrogen, methane and ethylene and are fed to a demethanizer column C103. Columns C102 and C103 are thermally coupled in that a liquid side draw from C103, depicted as stream 105, provides reflux to C102. Column C103 can employ one or more side condensers, depicted in FIG. 1 as E104.

The bottoms of C102 contain ethylene and ethane and are fed to an ethylene/ethane (C2) splitter column, C105. Column C102 is not thermally coupled with either C104 or C105. Instead, column C102 is reboiled in the conventional manner with reboiler exchanger E103. It has been surprisingly found that removing the thermal couple between columns C102 and C104 or C102 and C105 actually improves the energy efficiency of the process. Also important to this invention is that the pressure of stream 108 is decreased before it is fed to column C105. The figure shows this pressure reduction being accomplished through a pressure letdown valve, V101, though other methods are available and known to those skilled in the art.

The overheads of C104 contain mixtures of ethylene and ethane and exit in stream 114. This stream is fed to column C105. Columns C104 and C105 are thermally coupled in that a liquid side draw from C105, depicted as stream 115, provides reflux to C104. Columns C104 and C105 are operated at a pressure that is significantly lower than that of columns C101, C102, and/or C103. The bottoms of Column C104, depicted as stream 116, contain essentially all of the propylene and propane and are sent to a C3 splitter (not shown).

The overheads of C105 contain product quality ethylene and are removed as stream 110. Column C105 is refluxed in the conventional manner with a condensing exchanger E107. Column C105 is reboiled with exchanger E108 and the bottoms contain ethane which can be recycled to the cracking furnaces. There are many ways in which column C105 can be designed. FIG. 1 shows a simple design where C105 is reboiled in a conventional manner using a reboiler exchanger E108.

The overheads of C103 contain hydrogen, methane and small amounts of ethylene. They are cooled and at least partially condensed to provide reflux for C103. FIG. 1 shows this being accomplished with a standard partial condenser exchanger E105 and separation drum. Other methods of supplying reflux can be employed (e.g. dephlegmators) and are well known to those skilled in the art. Overhead vapors from the partial condenser exit in stream 106 and are sent to a cryogenic section to recover refrigeration value and optionally a hydrogen product.

TABLE

Stream Flows and Properties for FIG. 1

| | Stream No. | | | | | | | | | | |
|---|---|---|---|---|---|---|---|---|---|---|---|
| | 101 | 102 | 104 | 106 | 107 | 108 | 110 | 111 | 112 | 114 | 116 |
| Temperature (Deg F.) | −39.0 | −49.0 | −70.0 | −205.0 | −10.0 | 2.5 | −33.6 | 9.6 | 24.3 | −13.6 | 110.9 |
| Pressure (psia) | 340 | 338 | 323 | 322 | 323 | 333 | 220 | 240 | 345 | 235 | 240 |
| Molar flows (lb mol/hr) | | | | | | | | | | | |
| CO | 32.6 | 34.1 | 34.4 | 32.6 | 0.0 | 0.0 | 0.0 | 0.0 | 0.0 | 0.0 | 0.0 |
| HYDROGEN | 8253.1 | 8378.6 | 8378.3 | 8253.1 | 0.0 | 0.0 | 0.0 | 0.0 | 0.0 | 0.0 | 0.0 |
| METHANE | 4714.5 | 5356.1 | 5554.3 | 4712.6 | 0.8 | 0.7 | 1.1 | 0.0 | 0.4 | 0.4 | 0.0 |
| ETHYLENE | 9572.9 | 10944.9 | 10074.5 | 13.0 | 3953.7 | 3616.7 | 5593.3 | 12.9 | 1989.5 | 3829.7 | 0.0 |
| ETHANE | 2562.5 | 3008.6 | 1.5 | 0.0 | 1.0 | 1702.7 | 1.4 | 2559.3 | 858.8 | 2517.3 | 0.8 |
| ACETYLENE | 0.0 | 0.0 | 0.0 | 0.0 | 0.0 | 0.0 | 0.0 | 0.0 | 0.0 | 0.0 | 0.0 |
| PROPYLENE | 660.2 | 0.7 | 0.0 | 0.0 | 0.0 | 1.7 | 0.0 | 1.5 | 658.5 | 0.2 | 658.7 |
| PROPANE | 140.5 | 0.0 | 0.0 | 0.0 | 0.0 | 0.0 | 0.0 | 0.0 | 140.5 | 0.0 | 140.5 |
| PROPADIENE | 7.0 | 0.0 | 0.0 | 0.0 | 0.0 | 0.0 | 0.0 | 0.0 | 7.0 | 0.0 | 7.0 |
| METHYLACETYLENE | 3.5 | 0.0 | 0.0 | 0.0 | 0.0 | 0.0 | 0.0 | 0.0 | 3.5 | 0.0 | 3.5 |
| ISOBUTANE | 0.0 | 0.0 | 0.0 | 0.0 | 0.0 | 0.0 | 0.0 | 0.0 | 0.0 | 0.0 | 0.0 |
| ISOBUTENE | 0.0 | 0.0 | 0.0 | 0.0 | 0.0 | 0.0 | 0.0 | 0.0 | 0.0 | 0.0 | 0.0 |
| 1,3-BUTADIENE | 0.0 | 0.0 | 0.0 | 0.0 | 0.0 | 0.0 | 0.0 | 0.0 | 0.0 | 0.0 | 0.0 |
| BUTENE1 | 0.0 | 0.0 | 0.0 | 0.0 | 0.0 | 0.0 | 0.0 | 0.0 | 0.0 | 0.0 | 0.0 |
| n-BUTANE | 0.0 | 0.0 | 0.0 | 0.0 | 0.0 | 0.0 | 0.0 | 0.0 | 0.0 | 0.0 | 0.0 |
| T-BUTENE2 | 0.0 | 0.0 | 0.0 | 0.0 | 0.0 | 0.0 | 0.0 | 0.0 | 0.0 | 0.0 | 0.0 |
| C-BUTENE2 | 0.0 | 0.0 | 0.0 | 0.0 | 0.0 | 0.0 | 0.0 | 0.0 | 0.0 | 0.0 | 0.0 |

Contrary to the prior art, columns C103 and C105 are not thermally coupled. The bottoms of C103 are reboiled in the conventional manner with reboiling exchanger E106. The bottoms stream 107 contains product-quality ethylene. The embodiment shown in FIG. 1 has significant energy benefits over the prior art design. The features attributed to such an energy savings are the lack of thermal coupling of the bottoms section of the C2s distributor and the deethanizer, the lack of thermal coupling of the bottoms section of the ethylene distributor and the C2 splitter, and the operation of the deethanizer and C2 splitter at a substantially lower pressure than the other columns. Table 1 represents the compositions and properties of selected streams from FIG. 2.

As depicted in Table 1, the deethanizer and C2 splitter operate at a pressure substantially lower than the pressure of the other columns.

Replacing the thermal coupling between the C2 distributor and deethanizer with a separate reboiler on the C2 distributor is beneficial from an energy standpoint and results in a 382.1 horsepower (HP) savings in total energy. This energy savings is brought about because part of the deethanizer reboiler duty (requiring relatively high temperature heat) is shifted to a lower temperature level on the C2 distributor reboiler, where it becomes a useful heat sink for condensing 50 F propylene refrigerant. The changes in energy consumption can be found in Table 2.

TABLE 2

Changes in energy consumption by replacing thermal coupling between the C2 distributor and the deethanizer

| | | Without thermal coupling (this invention) | | With thermal coupling (Manley '054) | | | |
|---|---|---|---|---|---|---|---|
| Column | | Duty (MMBTU/hr) | Temp (F.) | Duty (MMBTU/hr) | Temp (F.) | Utility | Horsepower Savings |
| C2 distributor | $Q_{reb}$ | 7.19 | 24.1 | 0 | 24.1 | 50° F. Propylene refrigerant | 448 |
| Deethanizer | $Q_{con}$ | 8.42 | 3.4 | 7.73 | 3.4 | 25° F. Propylene refrigerant | −65.9 |
| | $Q_{reb}$ | 20.36 | 134.9 | 26.86 | 134.9 | 150 psi stream | |
| | | | | | | Net | 382.1 |

In addition, replacing the thermal coupling between the ethylene distributor and C2 splitter with a separate reboiler on the ethylene distributor is beneficial from an energy standpoint in that removing the thermal couple costs very little energy, but allows other process changes that provide significant energy savings. The changes in energy consumption brought about by removing the thermal couple between the ethylene distributor and the C2 splitter can be seen in Table 3.

TABLE 3

Changes in energy consumption by replacing thermal coupling between the ethylene distributor and the C2 splitter

| Column | | Without thermal coupling (this invention) | | With thermal coupling (Manley '054) | | | Horsepower |
| --- | --- | --- | --- | --- | --- | --- | --- |
| | | Duty (MMBTU/hr) | Temp (F.) | Duty (MMBTU/hr) | Temp (F.) | Utility | Savings |
| Ethylene distributor | $Q_{reb}$ | 10.26 | 0.8 | 0 | 0.8 | 0° F. Propylene refrigerant | 978.8 |
| C2 splitter | $Q_{con}$ | 96.69 | −12.7 | 93.89 | −12.7 | −45° F. Propylene refrigerant | −583.2 |
| | $Q_{reb}$ | 20.36 | 134.9 | 26.86 | 134.9 | 50° F. Propylene refrigerant | −464.8 |
| | | | | | | Net | −68 |

As seen here in Table 3, removing this thermal coupling causes little, if any, energy penalty. Removing this couple, however, does allow the deethanizer and C2 splitter to be operated at a lower, more efficient pressure, which results in a significant energy savings. When the aforementioned thermal couples are removed from the design, it is possible to operate the deethanizer and C2 splitter at a pressure lower than the rest of the columns. Operating these columns at a lower pressure is not possible with the fully coupled prior art, since lowering the C2 splitter pressure would require all other columns to be operated at lower pressure also, and any energy savings from a lower pressure C2 splitter would be offset by energy penalties elsewhere in the system. Operating the C2 splitter and deethanizer at a lower pressure than the other columns results in a significant energy savings because it reduces the condensor and reboiler duties and allows column reboiling and feed vaporizing to occur at lower temperatures, thus providing greater recuperating ability. These energy saving can be seen in Table 4 below.

TABLE 4

Energy consumption with low pressure deethanizer and C2 splitter

| Column | | Split feed & thermal coupling (Manley '054) | | Low pressure DeEth & C2 splitter (this invention) | | | Horsepower savings |
| --- | --- | --- | --- | --- | --- | --- | --- |
| | | Duty (MMBTU/hr) | Temp (F.) | Duty (MMBTU/hr) | Temp (F.) | Utility | |
| C2 splitter | $Q_{con}$ | 96.69 | −12.7 | 92.33 | −33.6 | −45° F. Propylene refrigerant | 908.2 |
| | $Q_{reb}$ | 76.88 | 31.1 | 70.27 | 9.6 | 25° F. Propylene refrigerant | 1921 |
| Ethane recycle | | 9.06 | −44 | 10.84 | −44 | −45° F. Propylene refrigerant | 370.8 |
| Deethanizer | $Q_{con}$ | 0 | 3.4 | 0 | −15.7 | | 0.0 |
| | $Q_{reb}$ | 14.45 | 134.9 | 12.27 | 110.7 | 150 psi steam | |
| | $Q_{feed}$ | 6.7 | 40 | 6.6 | 18.3 | 25° F. Propylene refrigerant | 210.9 |
| | | | | | | Net | 3411.0 |

Table 5 compares the propylene and ethylene system refrigeration horsepower required for the two designs for equivalent total ethylene production.

TABLE 5

Ethylene and Propylene Refrigeration Compressor Energy Requirements

Figure 2:
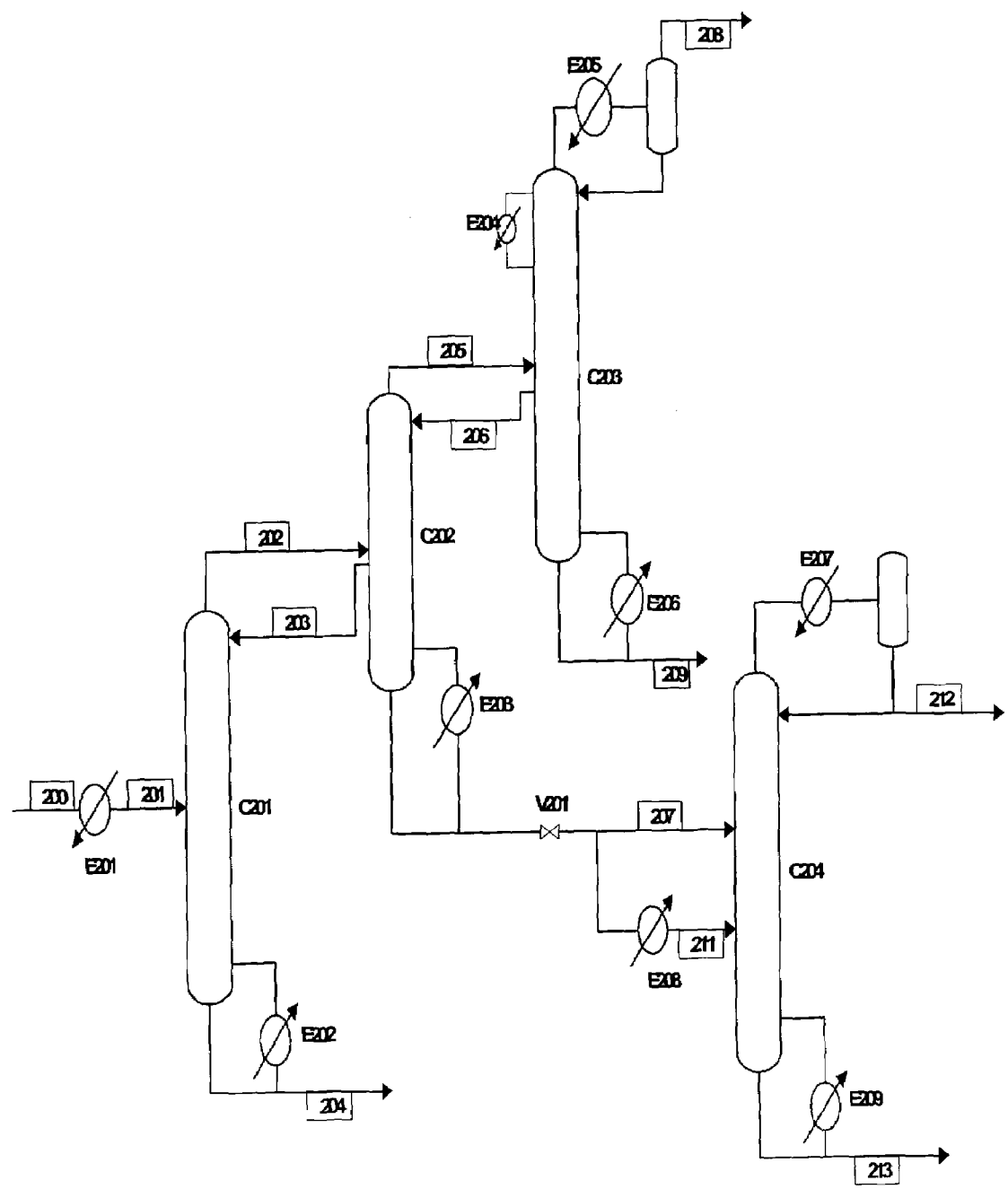
FIG. 2 depicts a front-end depropanizer ethylene recovery and purification design containing an ethylene distributor.

|  | Manley '054 | Embodiment of FIG. 2 |
|---|---|---|
| Total Refrigeration Compressor Energy (HP) | 45,778 | 42,053 |

The invention, as embodied in FIG. 1, saves a significant amount of energy over the prior art design. Those skilled in the art will also recognize that because the invention of FIG. 1 contains fewer thermal couplings between columns, it will be easier to operate and control than the prior art design.

With reference to FIG. 2, the feed stream to the process begins as an overhead stream from a depropanizer tower (not shown) and enters the process via stream 200. Stream 200 comprises a mixture of hydrogen, methane, ethane, ethylene, propane, and propylene. Stream 200 has optionally been passed through a hydrogenation reactor in order to remove essentially all of the acetylene, as well as portions of the methylacetylene and propadiene. The depropanizer overhead is optionally cooled in exchanger E201 before entering column C201, as stream 201.

Column C201 is a distillation device that serves as a deethanizer column. It can be either trayed or packed. The overhead of the column exits as stream 202, which contains essentially all of the hydrogen, methane, ethane, and ethylene. The bottoms of C201 exit as stream 204 and contain all of the propane and propylene that enter column C201. This bottoms stream can be directed to further downstream purification columns if desired.

Stream 202 enters column C202, which acts as an ethylene distributor. Columns C201 and C202 are thermally coupled such that a liquid side draw from C202, depicted as stream 203, provides reflux liquid to C201. The overheads of C202 exit as stream 205 and contain essentially all of the hydrogen and methane that enter the column, as well as a portion of the ethylene. The ratio of ethylene to ethane in stream 205 is such that product-quality ethylene can be made without further separation of ethylene and ethane.

The bottoms of column C202 exit in stream 207 and contain the remainder of the ethylene and essentially all of the ethane that enters C202. The pressure of stream 207 is reduced by a pressure letdown valve, V201, though other methods are available and known to those skilled in the art. Stream 207 is fed to column C204, which acts as an ethylene/ethane separation column. Columns 202 and 204 are not thermally coupled. Column 202 is reboiled using a conventional reboiler exchanger E203. Optionally, the feed to column C204 can be split and partially vaporized in exchanger E208, as shown in FIG. 2.

The overheads of C204 exit in stream 212 and contain product-quality ethylene. The bottoms of C204 exit in stream 213 and contain ethane and possibly a small amount of ethylene. The overheads of column C202, depicted as stream 205, enter column C203, which acts as a demethanizer. Columns C202 and C203 are thermally coupled such that a liquid sidedraw from C203, depicted as stream 206, provides reflux liquid to C202. Column C203 can employ one or more side condensers, depicted in FIG. 2 as E204.

The overheads of C203 contain hydrogen, methane and small amounts of ethylene. They are cooled and at least partially condensed to provide reflux for C203. FIG. 2 shows this being done with a standard partial condenser exchanger E205 and a separation drum. Other methods of supplying reflux (e.g. dephlegmators) can be employed and are well known to those skilled in the art. Overhead vapors from the partial condenser exit in stream 208 and are sent to a cryogenic section to recover refrigeration value and optionally a hydrogen product. Columns C203 and C204 are not thermally coupled. The bottoms of C203 are reboiled in the conventional manner with reboiling exchanger E206. The bottoms stream of C203, depicted as stream 209, contains product-quality ethylene.

FIG. 2 retains the key features of FIG. 1, including the lack of thermal coupling of the bottoms section of the ethylene distributor and the operation of the C2 splitter at a substantially lower pressure than the other columns. Table 6 represents the compositions and properties of selected streams from FIG. 2.

TABLE 6

Stream Flows and Properties for FIG. 2

| | Stream No. | | | | | | | | |
|---|---|---|---|---|---|---|---|---|---|
| | 201 | 202 | 204 | 205 | 207 | 208 | 209 | 212 | 213 |
| Temperature (Deg F.) | 5.0 | −11.0 | 176.3 | −70.0 | 35.7 | −194.6 | 18.1 | −33.6 | 9.6 |
| Pressure (psia) | 512.0 | 510.0 | 515.0 | 500.0 | 513.0 | 480.0 | 485.0 | 220.0 | 240 |
| Molar flows (lb mol/hr) | | | | | | | | | |
| CO | 32.6 | 36.1 | 0.0 | 32.9 | 0.0 | 32.6 | 0.0 | 0.0 | 0.0 |
| HYDROGEN | 8253.6 | 8651.7 | 0.0 | 8268.8 | 0.0 | 8253.6 | 0.0 | 0.0 | 0.0 |
| METHANE | 4714.5 | 5958.5 | 0.0 | 4815.4 | 0.9 | 4712.6 | 1.0 | 0.9 | 0.0 |
| ETHYLENE | 9573.0 | 18478.3 | 0.0 | 5637.5 | 4460.0 | 13.0 | 5100.0 | 4447.1 | 12.9 |
| ETHANE | 2562.4 | 6610.0 | 0.7 | 1.5 | 2560.4 | 0.0 | 1.3 | 1.1 | 2559.3 |
| ACETYLENE | 0.0 | 0.0 | 0.0 | 0.0 | 0.0 | 0.0 | 0.0 | 0.0 | 0.0 |
| PROPYLENE | 658.9 | 2.4 | 655.9 | 0.0 | 3.0 | 0.0 | 0.0 | 0.0 | 3.0 |
| PROPANE | 140.2 | 0.0 | 140.2 | 0.0 | 0.0 | 0.0 | 0.0 | 0.0 | 0.0 |
| PROPDIENE | 6.9 | 0.0 | 6.9 | 0.0 | 0.0 | 0.0 | 0.0 | 0.0 | 0.0 |
| METHYLACETYLENE | 3.6 | 0.0 | 3.6 | 0.0 | 0.0 | 0.0 | 0.0 | 0.0 | 0.0 |
| ISOBUTANE | 0.0 | 0.0 | 0.0 | 0.0 | 0.0 | 0.0 | 0.0 | 0.0 | 0.0 |
| ISOBUTENE | 0.0 | 0.0 | 0.0 | 0.0 | 0.0 | 0.0 | 0.0 | 0.0 | 0.0 |
| 13BUTADIENE | 0.0 | 0.0 | 0.0 | 0.0 | 0.0 | 0.0 | 0.0 | 0.0 | 0.0 |

TABLE 6-continued

Stream Flows and Properties for FIG. 2

| | Stream No. | | | | | | | | |
|---|---|---|---|---|---|---|---|---|---|
| | 201 | 202 | 204 | 205 | 207 | 208 | 209 | 212 | 213 |
| BUTENE1 | 0.0 | 0.0 | 0.0 | 0.0 | 0.0 | 0.0 | 0.0 | 0.0 | 0.0 |
| n-BUTANE | 0.0 | 0.0 | 0.0 | 0.0 | 0.0 | 0.0 | 0.0 | 0.0 | 0.0 |
| T-BUTENE2 | 0.0 | 0.0 | 0.0 | 0.0 | 0.0 | 0.0 | 0.0 | 0.0 | 0.0 |
| C-BUTENE2 | 0.0 | 0.0 | 0.0 | 0.0 | 0.0 | 0.0 | 0.0 | 0.0 | 0.0 |

The invention embodied in FIG. 2 has significant energy benefits over the prior art design. The lack of a thermal couple between the ethylene distributor, C202, and the C2 Splitter, C204, that is characteristic of this invention allows a number of process options that reduce the energy requirements of the system. Table 7 illustrates some of the major energy benefits of the design shown in FIG. 2.

TABLE 7

Energy Savings From Embodiment of FIG. 2

| Column | | Manley '054 Duty (MMBTU/hr) | Manley '054 Temp (F.) | Embodiment of FIG. 2 (this invention) Duty (MMBTU/hr) | Embodiment of FIG. 2 (this invention) Temp (F.) | Utility | Horsepower Savings |
|---|---|---|---|---|---|---|---|
| Ethylene distributor | $Q_{reb}$ | 0 | 0.8 | 19.3 | 35 | 50° F. Propylene Refrigerant | 1009.4 |
| C2 splitter | $Q_{con}$ | 93.9 | −13 | 81.9 | −35 | −45° F. Propylene Refrigerant | 2379.6 |
| | $Q_{reb}$ | 26.9 | 135 | 59.8 | 10 | 25° F. Propylene Refrigerant | 5106.9 |
| | | | | | | Net | 8495.9 |

Table 7 shows the duties and temperatures for the ethylene distributor and the C2 splitter for the Manley reference and the embodiment of FIG. 2. One benefit is the additional recuperation of 50° F. propylene refrigeration in the ethylene distributor reboiler. Another significant energy savings is brought about by shifting the C2 Splitter reboiler duty from 150 psi steam to recuperation of 25° F. propylene refrigeration. Finally, the C2 Splitter condenser duty decreases, producing an additional savings in −45° F. propylene refrigeration.

Note that in Tables 2, 3, 4, and 7, $Q_{con}$ refers to the heat duty of the condenser, and $Q_{reb}$ refers to the heat duty of the reboiler.

It should be noted that these savings are partially offset by energy penalties elsewhere in the system. For example, the reflux requirement of C201 is significantly higher than that of C101, and the duty is required at a significantly lower temperature. This offsets a portion of the savings outlined in Table 6, but a rigorous energy analysis of the overall system indicates that there is a net energy benefit for the process of FIG. 2 compared with the prior art. Table 8 compares the total propylene and ethylene system refrigeration horsepower required for both the prior art design and the invention design in FIG. 2 for equivalent total ethylene production. It is clear that there is an overall energy savings for the process of FIG. 2 over the prior art design.

TABLE 8

Ethylene and Propylene Refrigeration
Compressor Energy Requirements

| | Manley '054) | Embodiment of FIG. 2 |
|---|---|---|
| Total Refrigeration Compressor Energy (HP) | 45,778 | 42,185 |

All major separation, heating, and cooling steps have been shown in the description of the preferred embodiments. Some details of the process design that are well known to those skilled in the art, such as vapor-liquid separation drums, process control valves, pumps, and the like, have been omitted in order to demonstrate more clearly the important concepts of the invention.

We claim:

1. A process for the separation and recovery of hydrocarbon components, comprising:

a. introducing a hydrocarbon feed comprising a mixture of hydrogen, methane, ethane, ethylene, propane, propylene and optionally heavier components into a first separation column to obtain a first top stream and a first bottom stream;
b. introducing said first top stream into a second separation column to obtain a second top stream and a second bottom stream;
c. refluxing said first separation column with a liquid draw from said second separation column;
d. reboiling said first separation column with a reboiler exchanger;
e. introducing said first bottom stream into a third separation column to obtain a third top stream and a third bottom stream;
f. introducing said second top stream into a fourth separation column to obtain a fourth top stream and a fourth bottom stream;
g. refluxing said second separation column with a liquid draw from said fourth separation column;
h. reboiling said second separation column with a reboiler exchanger;
i. chilling said fourth top stream to provide reflux for said fourth separation column;
j. introducing said second bottom stream and said third top stream into a fifth separation column to obtain a fifth top stream and a fifth bottom stream;
k. refluxing said third separation column with a liquid draw from said fifth separation column; and
l. recovering said fourth bottom stream and said fifth top stream as a hydrocarbon component;
wherein said third and fifth separation columns operate at a pressure substantially lower than the pressure levels of said first, second, and fourth separation columns.

2. The process of claim 1 wherein said first separation column is a C2 distributor.

3. The process of claim 1 wherein said first top stream comprises a mixture of hydrogen, methane, ethane, and ethylene, and further wherein said first bottom stream comprises a mixture of ethane, ethylene, propane, and propylene and optionally heavier components.

4. The process of claim 1 wherein said second separation column is an ethylene distributor.

5. The process of claim 1 wherein said second top stream comprises a mixture of ethylene, hydrogen, and methane, and further wherein said second bottom stream comprises a mixture of ethylene and ethane.

6. The process of claim 1 wherein said third separation column is a deethanizer.

7. The process of claim 1 wherein said third top stream comprises a mixture of ethylene and ethane, and further wherein said third bottom stream comprises a mixture of propylene and propane and optionally heavier components.

8. The process of claim 1 wherein said fourth separation column is a demethanizer.

9. The process of claim 1 wherein said fourth top stream comprises a mixture of hydrogen and methane, and further wherein said fourth bottom stream comprises a recoverable ethylene component.

10. The process of claim 9 wherein a dephlegmator assists said demethanizer in ethylene recovery.

11. The process of claim 1 wherein said fifth separation column is a C2 splitter.

12. The process of claim 1 wherein said fifth top stream comprises a recoverable ethylene component, and further wherein said fifth bottom stream comprises ethane.

13. The process of claim 8 wherein said demethanizer comprises one or more side condensers.

14. A process for the separation and recovery of hydrocarbon components comprising:
a. introducing a hydrocarbon feed comprising a mixture of hydrogen, methane, ethane, ethylene, propane, and propylene and optionally heavier components into a first separation column to produce a first top stream and a first bottom stream;
b. introducing said first top stream into a second separation column to produce a second top stream and a second bottom stream;
c. refluxing said first separation column with a liquid draw from said second separation column;
d. introducing said second top stream into a third separation column to product a third top stream and a third bottom stream;
e. refluxing said second separation column with a liquid side draw from said third separation column;
f. reboiling said second separation column with a reboiler exchanger;
g. introducing said second bottom stream into a fourth separation column to produce a fourth top stream and a fourth bottom stream; and
h. recovering said third bottom stream and said fourth top stream as a hydrocarbon component;
wherein said fourth separation column operates at a pressure substantially lower than the pressure levels of said first, second, and third separation columns.

15. The process of claim 14 wherein said first separation column is a deethanizer.

16. The process of claim 14 wherein said first top stream comprises a mixture of ethylene, ethane, hydrogen, and methane, and further wherein said first bottom stream comprises a mixture of propylene and propane and optionally heavier components.

17. The process of claim 14 wherein said second separation column is an ethylene distributor.

18. The process of claim 14 wherein said second top stream comprises a mixture of ethylene, hydrogen, and methane, and further wherein said second bottom stream comprises a mixture of ethylene and ethane.

19. The process of claim 14 wherein said third separation column is a demethanizer.

20. The process of claim 14 wherein said third top stream comprises a mixture of hydrogen and methane, and further wherein said third bottom stream comprises a recoverable ethylene components.

21. The process of claim 20 wherein a dephlegmator assists said demethanizer in ethylene recovery.

22. The process of claim 14 wherein said fourth separation column is a C2 splitter.

23. The process of claim 14 wherein said fourth top stream comprises a recoverable ethylene component, and further wherein said fourth bottom stream comprises ethane.

24. The process of claim 19 wherein said demethanizer comprise one or more side condensers.

* * * * *